Nov. 9, 1937.  D. J. JONES  2,098,806
SYSTEM OF CONTROL FOR AIR CIRCULATING MEANS
Filed Oct. 12, 1935
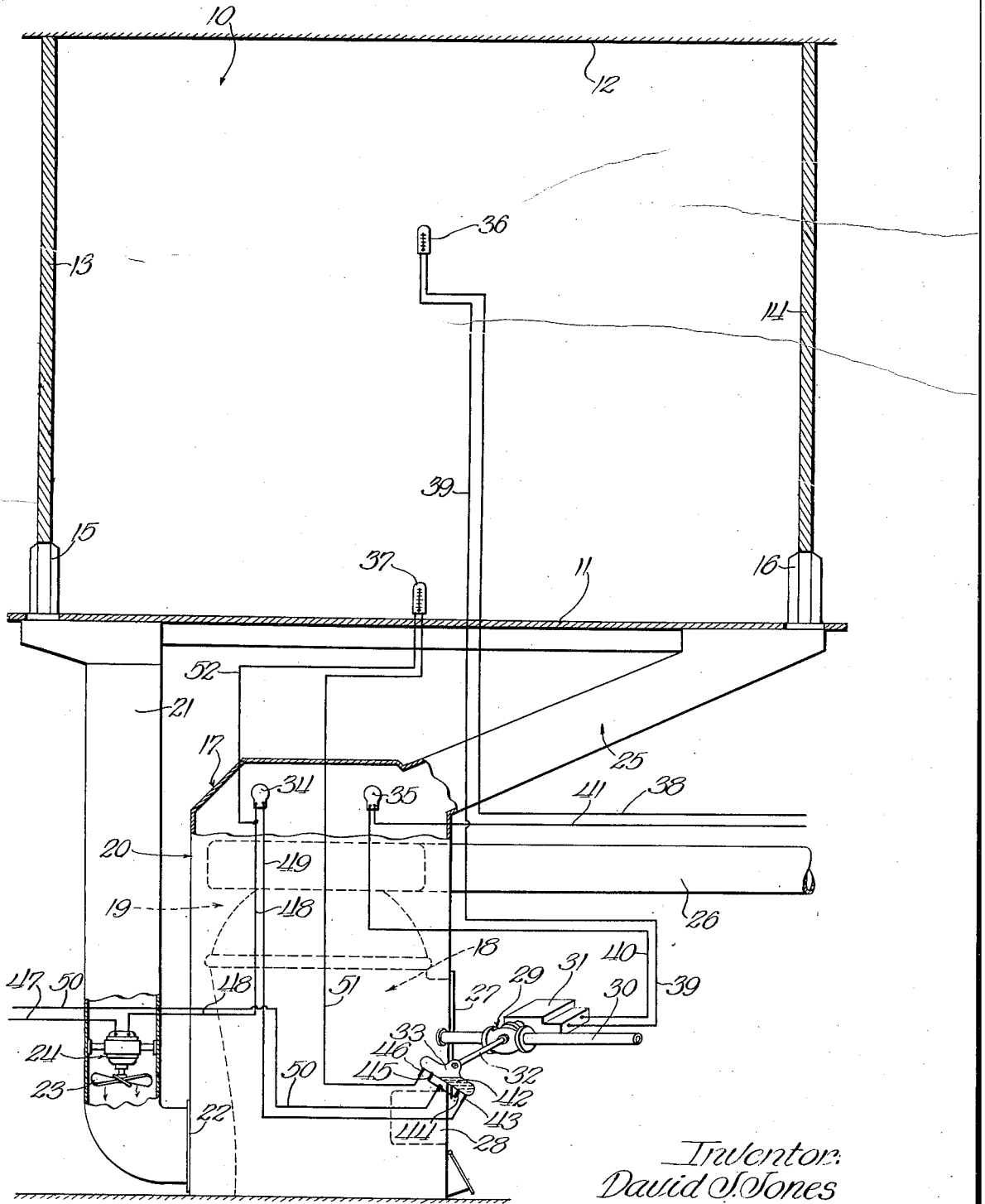
Inventor:
David J. Jones
By George H. Fisher
Atty.

Patented Nov. 9, 1937

2,098,806

UNITED STATES PATENT OFFICE 2,098,806

SYSTEM OF CONTROL FOR AIR CIRCULATING MEANS

David J. Jones, Elmhurst, Ill., assignor to Minneapolis-Honeywell Regulator Company, Minneapolis, Minn., a corporation of Delaware Application October 12, 1935, Serial No. 44,749

5 Claims. (Cl. 236—11)

The present invention relates to systems of control for air circulating means, and is particularly concerned with controlling devices for warm air furnaces. It should be understood, however, that the control system may be used for any air circulating means of any temperature, and may also be employed for the control of other mediums for the transmission of heat than air, provided equivalent controlling devices and forced circulation devices are employed.

In the devices of the prior art of this type, a warm air furnace is usually provided with a fan for effecting a forced circulation, the fan and the heating device being controlled by certain thermostatic controlling devices. For example, a room thermostat is usually provided, which turns the heating devices on or off, or controls the amount of opening for fuel or draft, so that heat is supplied to the air passing through the furnace air conduits when required by the room thermostat.

A high limit fuel control is also usually provided and located in the bonnet of the furnace, primarily as a safety device for protection against too high temperatures in or adjacent the furnace, and this consists of a thermostat which is adapted to turn off the heat controlling device, even though the room thermostat is turned on, in case the temperature at the bonnet of the furnace exceeds the high limit.

The disadvantages of these prior devices are that the fan shuts off at the same time that the heating device is shut off, and when the forced circulation is stopped the air immediately starts to stratify in the room; that is, there are definite temperatures established at the floor, the ceiling, and intermediate temperatures between the floor and the ceiling, the ceiling being at the highest temperature and the floor at the lowest temperature. Under these conditions there is a big differential between the temperature at the floor and the temperature at the ceiling, which may amount to as much as twenty-five degrees F. Consequently, if it is warm enough at one level in the room, it is too hot at higher levels, and too cold at lower levels in the same room.

The room thermostat is usually installed at eye level, and the result of this is that the room thermostat may be satisfied and indicate the desired temperature at that level, but the temperature effect which is secured in the room is what is usually termed a "cold 70" or a "cold floor" condition. There may be as much difference as ten degrees F. between the temperature at the eye level or room thermostat and the floor, and this is manifestly a very unsatisfactory condition. Heating systems which are controlled in such manner as to produce this result are so unsatisfactory that they are being removed and other heating systems of even less modern construction are being installed.

When the room thermostat is installed at a lower level, such as, for example, the baseboard proper, floor temperature is attained, but the room is too hot at eye level; and, furthermore, the system which might be economical with the room thermostat at eye level immediately passes the bounds of economical operation when the room thermostat is installed at floor level and the entire system is heated to a higher temperature. This is particularly true where gas is used as the fuel element.

One of the objects of the present invention is the provision of an improved system of control for air circulating means which results in the elimination of the condition known as "cold 70" or "cold floor", without unduly raising the temperature at other points, and without the expenditure for fuel which would be required to get the proper temperature at the floor with the systems of the prior art.

Another object of the invention is the provision of an improved control system of the class described, in which the air circulation fan motor is separately controlled by a baseboard or floor thermostat during that part of the cycle when the fuel controlling devices or heating devices have been turned off, but in which the circulating fan motor is subject to the control of the room thermostat, when the heating devices or fuel controlling devices are turned on.

Another object of the invention is the provision of a control system for air circulating means which utilizes more economically the heat which is transmitted to the air in the room by the furnace, so as to effect a saving of fuel and to constantly keep the room at the proper temperature desired and called for by the controlling thermostats, without using an excessive number of controlling devices and/or forced circulation fans.

Other objects, features and advantages of the invention will be apparent from the following description and the accompanying drawing, in which similar characters of reference indicate similar parts throughout the several views.

Referring to the single sheet of drawing accompanying this specification, the figure shown is a diagrammatic vertical sectional view of a warm air furnace and room, showing enough of an installation constructed according to the present invention to be exemplary of such an installation in any heating system. 10 indicates in its entirety one of the rooms of the house, bounded by the floor 11, ceiling 12, and walls 13, 14. The room is preferably provided with the wall registers 15, 16, which may be located in the walls 13, 14 respectively, the former serving as a cold air register, and the latter as a warm air register.

The furnace 17 is diagrammatically shown below the floor 11, and comprises the usual inner combustion chamber 18, which is surrounded by the air circulation conduits 19. The outer housing 20 of the furnace communicates with the various cold air and warm air ducts, only two of which are shown, although any number of cold air and warm air ducts may be used. For example, the cold air register 15 communicates, by means of a cold air duct 21, with an opening 22 in the lower part of the furnace housing 20; and a forced air circulating device, such as an air circulating fan 23 and electric motor 24, being preferably included in the cold air duct 21. The arrangement is such that the fan draws the air in at the cold air duct 15 from the room 10 and forces it into the lower part of the furnace or chambers 19.

The warm air ducts, such as, for example, duct 25, communicate with the top of the furnace; and this particular duct leads from the top of the furnace to the warm air register 16 of room 10.

The purpose of connecting the cold air ducts at the bottom of the furnace and the warm air ducts at the top is to take advantage of the natural convection currents which are produced by the effect of heating of the air in the furnace, thereby reducing slightly the load on the air circulating fan and motor 23, 24 over that which would be required if this arrangement were not used. The pipe 26 is the conventional stack leading from the furnace fire pot 18 to the chimney, and of course the furnace is provided with all of the usual appurtenances, such as the stove door 27 and the ash pit door 28.

It should be understood that the present controlling system may be utilized with all kinds of warm air furnaces, such as, for example, coal or wood burners, gas burners, or fuel oil burners. The fuel valve which is used to explain the invention is, therefore, exemplary of the liquid fuel control and valve in an oil burner, the gas valve in a gas burner, or the automatic feeding means for a coal stoker, with or without a control of the draft or air circulating fan of the burner of any of these devices.

Thus the drawing shows diagrammatically what may be termed a fuel valve 29 controlling the pipe 30 which leads into the furnace and, as stated, this is exemplary of any of the controlling devices for the various types of furnaces.

The fuel valve 29 may be controlled by an electro-magnetic device 31, such as one or more suitable solenoids, adapted to turn the valve shaft 32 and to turn the fuel valve on or off when the solenoids 31 are energized or deenergized, respectively.

The system is preferably provided with an auxiliary switch 33, which is mechanically connected with the fuel valve 29 and adapted to be operated by the same electrical means 31 which operates the fuel valve 29. The fuel valve 29 may, of course, also be operated by means of a motor instead of solenoids, the diagrammatic showing of the device at 31 being indicative of any electric controlling device for the fuel valve and auxiliary switch.

While the auxiliary switch 33 is shown as a mercury switch, it should also be understood that any type of mechanical electric switch may be used and provided with a suitable fixture and moving contacts to accomplish the same result.

The system is also preferably provided with the thermostatic switch 34, which consists of a thermostat located in the bonnet of the furnace, and adapted to turn off the fan when the temperature in the furnace reaches a low limit. The purpose of this switch is to prevent the circulating fan 24 from operating when there is nothing but cold air in the furnace, as a cool condition, which might otherwise be fairly satisfactory, would be rendered worse if the fan were caused to circulate the relatively cold air under such conditions.

It is also preferably provided with a high limit fuel control 35, which consists of a thermostatic switch 34 located in the bonnet of the furnace 17, and adapted to turn off the motor operated fuel valve 29, which in the furnace reaches a predetermined high limit. The purpose of the high limit fuel control 35 is to prevent the overheating of the furnace or heating beyond a predetermined limit, such as might occur if the room thermostat were located near an open window, so that it would constantly demand more heat.

The system is also preferably provided with the usual room thermostat 36, comprising a thermostatic switch, which may be located at eye level, and which is adapted to control the motor operated fuel valve 29, subject to the limitations of the high limit fuel control 35.

According to the present invention, a second thermostat or baseboard thermostat 37, located at or near the floor 11, is employed for the purpose of controlling the circulating fan motor 24 when the motor operated fuel valve 29 is turned off. The baseboard thermostat 37 also consists of a suitable thermostatic switch.

The electrical connections for accomplishing the results desired are as follows:

A conductor 38 may lead from the line to one terminal of the room thermostat 36. A second conductor 39 leads from the other terminal of the room thermostat 36 to one terminal of the motor operated fuel valve 31. The second terminal from the fuel valve motor 31 is connected by a conductor 40 to one terminal of the high limit fuel control 35. The other terminal of the high limit fuel control is connected by a conductor 41 to the line.

The auxiliary switch 33 is provided with the usual globule of mercury or movable switch contact 42 located in a suitable insulating container which supports the fixed contacts 43, 44, 45 and 46.

The auxiliary switch 33 is shown in the position assumed when the fuel control valve 29 is open. In this position, the mercury 42 is in engagement with contacts 43 and 44 and electrically connects the same. When the valve 29 is closed, the left end of the switch 33 is tilted downward and the mercury globule rolls out of engagement with contacts 43 and 44 and into engagement with contacts 45 and 46 causing the latter contact to become electrically connected.

The system constructed according to the present invention is preferably provided with a second circuit leading from a line or source of electricity, as follows:

A conductor 47 may lead from the line to one terminal of the circulating fan motor 24. The conductor 48 from the other terminal of the fan motor 24 leads to one terminal of the fan switch 34. The other terminal of the fan switch 34 is connected by conductor 49 to the contact 43 of the auxiliary switch 33. The two contacts 44, 45 of the auxiliary switch 33 are connected by a single conductor 50 to the line. The fixed contact 46 of the auxiliary switch 33 is connected by a conductor 51 to one terminal of the base-board thermostat 37. The other terminal of the base-board thermostat 37 is connected by a conductor 52 to the conductor 48 which leads to the circulating fan motor 24.

The operation of the present system is as follows: when the furnace is operating and the room thermostat is set at a predetermined temperature, such, as for example, 70 or 72 degrees, the motor operated fuel valve will be maintained in open position until the air in the room 10, at room thermostat level, that is, eye level, attains this predetermined temperature. Then the room thermostat is said to be "satisfied", and it operates to open the circuit leading from the line 38 to the motor 31 which operates the fuel valve. The fuel valve 29 is then closed, and at the same time the auxiliary switch 33 is moved to electrically separate contacts 43 and 44.

It should be understood, of course, that this is the operation in the case of an open circuit system, that is, in which the circuit is open when the motor operated fuel valve is turned off. It should also be understood that the converse or closed circuit system may also be employed.

While the motor operated fuel valve 29 is turned on and the burner is operating, the circulating fan motor 24 also begins to operate as soon as the furnace warms up to the temperature required by the fan switch 34. The circuit of the circulating fan motor would then be as follows: Conductor 47, motor 24, conductor 48, fan switch 34, conductor 49, contact 43, mercury globule 42, contact 44, conductor 50, to line.

The circulating fan motor will operate, however, only when the air in the furnace is warm enough to reach the predetermined lower limit which is set by the thermostatic fan switch 34, so that air will not be circulated when it is too cool to give the proper result.

As soon as the motor operated fuel valve is turned off, by reason of the fact that the room thermostat 36 is satisfied, the circuit between contacts 45 and 46 is closed, so that the baseboard thermostat gets into control of the circulating fan motor 24. If, then, the air starts to stratify and the room becomes slightly cooler at the floor, the base-board thermostat operates to close its circuit and turn the circulating fan motor on, while the room thermostat 36 is turned off. The forced circulation of the air through the furnace and ducts will then operate to raise the floor temperature and prevent the stratification of the air in the room, which would otherwise take place. Such circulation will continue until the temperature at the base-board exceeds that required by the base-board thermostat 37, in which case the fan motor 24 would again be shut off.

The circuit through the base-board thermostat and fan motor is as follows: Line to conductor 50, contact 45, mercury globule 42, contact 46, conductor 51, base-board thermostat 37, conductor 52, conductor 48, fan motor 24, conductor 47.

As soon as the room temperature at the level of the room thermostat 36 drops below the predetermined temperature required by that device, the room thermostat again closes its circuit and takes away from the base-board thermostat 37 the control of the fan motor 24. The base-board thermostat may thus be set a few degrees below the temperature setting of the room thermostat 36, and by means of the separate control of the circulating fan motor, by this base-board thermostat, while the motor operated fuel valve is turned off, the air is prevented from stratifying, and the heated air in the system is utilized to keep the floor temperature at a proper level, even when the burner is shut off.

It is found that the present system substantially eliminates the unsatisfactory condition known as "cold 70" or "cold floor", without increasing the fuel consumption by any substantial or noticeable amount, and thus making a completely satisfactory control for air circulating systems of this type. A great many gas burners have been removed from homes after a trial on account of unsatisfactory operation, the principal source of dissatisfaction being the cold floor condition. When the ordinary room thermostat is placed at the floor level, the room is too hot at higher levels and the operation of a gas burner in particular becomes too expensive.

I wish to emphasize, therefore, that the present system of control is of the utmost importance, since it remedies this unsatisfactory condition without involving any additional operating expense except the slight amount of current which is consumed by operating the fan motor. The improvements embodied in my system of control make a satisfactory operating system out of what has otherwise proven to be totally unsatisfactory to thousands of users of gas burners, and it is equally applicable to oil burners and other types of furnaces.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a system for controlling the temperature of a space, means for circulating air through said space, means for varying the temperature of said air, a regulator for said temperature varying means movable between heat increasing and heat decreasing positions, a first temperature responsive device responsive to the temperature at an intermediate level in said space, a second temperature responsive device responsive to the temperature at a lower level in said space, a third temperature responsive device responsive to the temperature of the air adjacent said temperature varying means, means including said first temperature responsive device operative upon the temperature at said intermediate level falling below a predetermined value to cause said regulator to move to its heat increasing position, and means controlled by the position of said regulator for causing said air circulating means to be controlled by said second temperature responsive device when said regulator is in its heat decreasing position and by said third temperature responsive device independently of said second temperature responsive device when said regulator is in its heat increasing position.

2. In a warm air heating system for controlling the temperature of a space, a furnace fan for circulating air through said space, a furnace for heating said air, a regulator for regulating the heat producing medium supplied to the furnace and movable between heat increasing and heat decreasing positions, a first temperature responsive device responsive to the temperature at an intermediate level in said space, a second temperature responsive device responsive to the temperature at a lower level in said space, a third temperature responsive device responsive to the temperature in the furnace bonnet, means including said first temperature responsive device operative upon the temperature at said intermediate level falling below a predetermined value to cause said regulator to move to its heat increasing position, and means controlled by the position of said regulator for causing said furnace fan to be controlled by said second temperature responsive device when said regulator is in its heat decreasing position and by said third temperature responsive device independently of said second temperature responsive device when said regulator is in its heat increasing position.

3. In a system for controlling the temperature of a space, electrically operated means for circulating air through said space, means for varying the temperature of said air, an electrically operated regulator for said temperature varying means movable between heat increasing and heat decreasing positions, a first temperature responsive switch responsive to the temperature at an intermediate level in said space, a second temperature responsive switch responsive to the temperature at a lower level in said space, a third temperature responsive switch responsive to the temperature of the air adjacent said temperature varying means, circuit means including said first temperature responsive switch operative upon the temperature at said intermediate level falling below a predetermined value to cause said regulator to move to its heat increasing position, and switching means controlled by the position of said regulator for causing said air circulating means to be controlled by said second temperature responsive switch when said regulator is in its heat decreasing position and by said third temperature responsive switch independently of said temperature responsive switch when said regulator is in its heat increasing position.

4. In a system for controlling the temperature of a space, means for circulating air through said space, means for varying the temperature of said air, a regulator for said temperature varying means movable between heat increasing and heat decreasing positions, a first temperature responsive device responsive to the temperature at an intermediate level in said space, a second temperature responsive device responsive to the temperature at a lower level in said space, a third temperature responsive device responsive to the temperature of the air adjacent said temperature varying means, transfer means which when in a first position places said air circulating means under the control of said second temperature responsive device and when in a second position places said air circulating means under the control of said third temperature responsive device independently of said second temperature responsive device, and means including said first temperature responsive device operative upon the temperature at said intermediate level falling below a predetermined value to cause said transfer means to move to its second position and to cause said regulator to move to its heat increasing position and upon the temperature at said intermediate level rising above a predetermined value to cause said transfer means to move to its first position and said regulator to move to its heat decreasing position.

5. In a system for controlling the temperature of a space, electrically operated means for circulating air through said space, means for varying the temperature of said air, an electrically operated regulator for said temperature varying means movable between heat increasing and heat decreasing positions, a first temperature responsive switch responsive to the temperature at an intermediate level in said space, a second temperature responsive switch responsive to the temperature at a lower level in said space, a third temperature responsive switch responsive to the temperature of the air adjacent said temperature varying means, switching means which when in a first position causes said air circulating means to be controlled by said second temperature responsive switch and which when in a second position causes said air circulating means to be controlled by said third temperature responsive switch independently of said second temperature responsive switch, and means including said first temperature responsive switch operative upon the temperature at said intermediate level falling below a predetermined value to cause said regulator to move to its heat increasing position and to cause said switching means to move to its second position and upon the temperature at said intermediate level rising above a predetermined value to cause said regulator to move to its heat decreasing position and to cause said switching means to move to its first position.

DAVID J. JONES.